United States Patent [19]

Prewo

[11] 4,422,725

[45] Dec. 27, 1983

[54] METHOD OF OPTIMALLY OPERATING A GRAPHITE FIBER REINFORCED GLASS MATRIX COMPOSITE OPTICAL ARTICLE

[75] Inventor: Karl M. Prewo, Vernon, Conn.

[73] Assignee: United Technologies Corporation, Hartford, Conn.

[21] Appl. No.: 243,689

[22] Filed: Mar. 16, 1981

[51] Int. Cl.³ .............................................. G02B 5/08
[52] U.S. Cl. .................................................. 350/310
[58] Field of Search ................................ 350/288, 310

[56] References Cited

U.S. PATENT DOCUMENTS

| | | | |
|---|---|---|---|
| 4,175,834 | 11/1979 | Sigman et al. | 350/310 |
| 4,221,469 | 9/1980 | Stalcup et al. | 350/310 |
| 4,253,739 | 3/1981 | Carlson | 350/310 |
| 4,256,378 | 3/1981 | Prewo et al. | 350/310 |
| 4,265,968 | 5/1981 | Prewo | 428/336 |
| 4,357,286 | 11/1982 | Stalcup et al. | 350/310 |

Primary Examiner—F. L. Evans

Attorney, Agent, or Firm—Stephen A. Schneeberger

[57] ABSTRACT

A method is provided for minimizing thermal geometrical distortion of optical articles, such as a laser mirror, comprised in significant part of a graphite fiber reinforced-glass matrix composite. The temperature of the article, and effectively the composite, is maintained, at least for some particular interval, within a range of temperatures at which the absolute coefficient of thermal expansion of the composite (and thus the article) is substantially a minimum. In most instances that minimum is substantially zero and the temperature range is sufficiently wide, i.e. 25° C. or more, as to be easily maintained. The desired temperature may be attained prior to operation of the article, as for a laser mirror. A suitable cooling and/or heating arrangement is associated with the article and may respond to maintain a sensed temperature within a desired range. Where heating is required, an electrical current passed through the article may provide resistance heating.

13 Claims, 7 Drawing Figures

METHOD OF OPTIMALLY OPERATING A GRAPHITE FIBER REINFORCED GLASS MATRIX COMPOSITE OPTICAL ARTICLE

DESCRIPTION

TECHNICAL FIELD

The invention relates to the optimal operation of graphite fiber reinforced-glass matrix composite optical elements such as laser mirrors.

BACKGROUND ART

Various materials have been developed in recent years for utilization in optical articles which require a high degree of thermal stability. Certain composites are particularly attractive in this regard, especially when the article's weight and its time and cost of fabrication are important considerations. Laser mirrors, and especially such mirrors intended for use with high energy lasers and possibly in the remoteness of outer space, have found such thermally stable composite materials to be advantageously used in their construction.

An example of a particularly suitable composite material utilized in the formation of a laser mirror is disclosed in U.S. Pat. No. 4,256,378 issued Mar. 17, 1981 to K. M. Prewo et al for Graphite-Glass Composite Laser Mirror. That application discloses a laser mirror comprised of a graphite fiber/glass matrix composite. That composite material provides a laser mirror of low density, high elastic stiffness, high strength, high fracture toughness, low thermal expansion, high thermal conductivity and environmental stability.

Although the graphite fiber/glass matrix composite disclosed in the aforementioned U.S. Pat. No. 4,256,378 permits the formation of laser mirrors which exhibit a relatively high degree of dimensional stability over a relatively wide temperature range, the demanding requirement for maintaining precise optical alignment in a laser optical system affords room for even greater improvement.

Accordingly, it is a principal object of the present invention to provide a method by which an optical article comprised of a graphite fiber/glass matric composite may exhibit increased dimensional stability, particularly during exposure to certain operating environments. Included within this object is the provision of such method for use with laser mirrors comprising in at least significant part a graphite fiber/glass matrix composite.

It is a further object of the present invention to provide a relatively practical method for increasing the dimensional stability of a graphite fiber/glass matrix composite laser mirror during operation.

DISCLOSURE OF INVENTION

In accordance with the present invention, there is provided a method for use with an optical article, such as a laser mirror, comprising in significant part a graphite fiber reinforced-glass matrix composite. More specifically, the method is utilized for minimizing thermal geometrical distortion of such optical articles and comprises the step of maintaining the temperature of the article, and effectively the composite, at least for some particular interval, within a range of temperatures at which the absolute (i.e. independent of sign) coefficient of thermal expansion of the composite, and thus the article, is substantially a minimum. In most instances, that minimum will be substantially zero and the range of temperatures is sufficiently wide, i.e. at least about 25° C., as to be relatively easily maintained. For a laser mirror, the desired temperature range is attained prior to the incidence of a laser beam thereon and is maintained while operating with the laser beam incident thereon.

In a preferred arrangement, variably controllable temperature conditioning apparatus is associated with the laser mirror, the temperature of the mirror is sensed and is used to adjustably control the temperature conditioning means to maintain the sensed temperature within the desired operating range. Where the desired temperature range requires heating the mirror, such heating is obtained by passing an electrical current through the mirror for resistance heating.

BEST MODE FOR CARRYING OUT THE INVENTION

Figure 1:
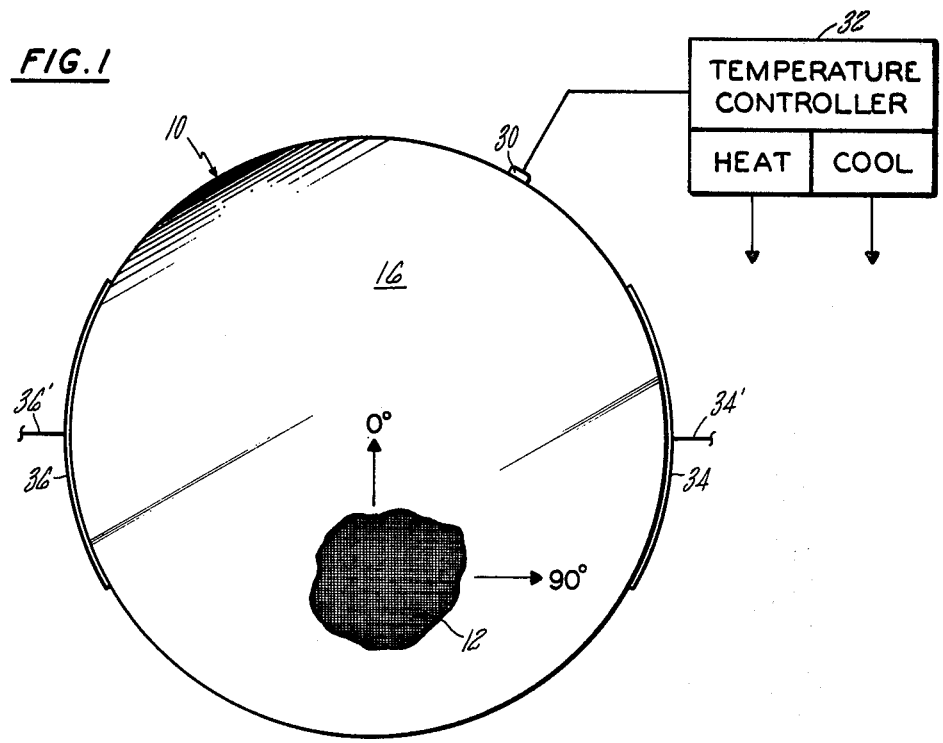
FIG. 1 is a plan view of a laser mirror adapted for temperature-controlled operation and partly broken away to reveal a typical 0°/90° cross-ply graphite fiber lay-up.

Referring to FIG. 1, there is illustrated an optical article, specifically a laser mirror 10, comprising in significant part a graphite fiber-reinforced glass matrix composite. The mirror 10 is manufactured generally in accordance with the disclosure of the aforementioned U.S. Pat. No. 4,256,378, which is incorporated herein by reference for its teaching of the general composition and manufacture of a graphite-glass composite (hereinafter GGC) especially as utilized in a laser mirror. In the preferred embodiment illustrated in FIGS. 1 and 2, the graphite-glass composite is formed by laying up the graphite fibers 20 in alternating ply stack-up sequence of 0° and 90° in the glass matrix 22. It will be understood, however, that other arrangements may also be provided in which the fibers extend only in one direction, i.e. 0°, or in two or more plies other than 0° and 90°, i.e. 0° and 45°; 0°, 45° and 90°, 0°, 30° and 90°; 0° and 60° etc.

Figure 2:
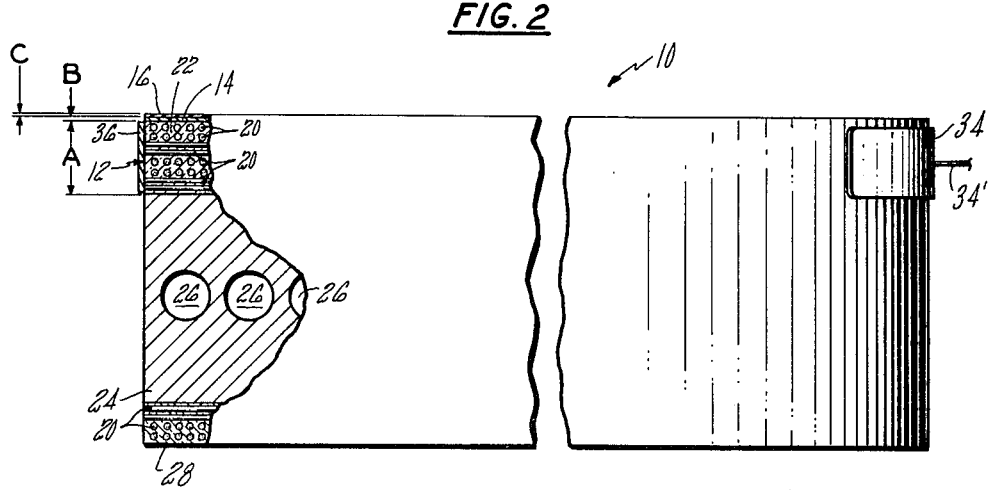
FIG. 2 is an elevational view of the mirror of FIG. 1 having a portion broken away.

Referring to FIG. 2, the graphite-glass composite material 12 constitutes the principal structural element in the laser mirror 10. Typically, the GGC element 12 may have a thickness A within the range of 0.1 in. to 0.25 in. or more and the graphite fibers 20 are arrayed in matrix 22 as previously mentioned. The finished composite element 12 can be so molded as to provide the reflecting surface shape itself, e.g., by using a highly polished releasable mold surface, but generally it is preferable to provide the mirror composite with a first polishing coating 14 of suitable material and finally a very thin reflective coating 16 of a suitable material used in the laser mirror art. Typically, the thickness B of polishing coating 14 is less than 0.001 in. and the thickness C of reflective coating 16 is substantially less than that, typically being in the region of 1000 Angstroms.

The laser mirror 10 may additionally include a backing plate 24 of metal (shown in FIG. 2) or graphite/glass composite (GGC), to facilitate mounting and orienting the mirror and for temperature control. Importantly to the present invention, plate 24 contains a labyrinth of passages 26 through which a temperature-controlled fluid may be passed for cooling or heating the mirror 10. In various prior art uses of laser mirrors, a coolant was passed through passages 26 to maintain the temperature of mirror 10 below that at which the surface reflective coatings would begin to separate or degrade. An optional further structural element 28, similar in composition to GGC element 12, completes the structure of mirror 10.

In accordance with the present invention, the mirror 10 is operated in a manner which further increases its dimensional stability. Although GGC materials such as those used in element 12 of mirror 10 exhibit substantially improved dimensional stability over a broad range of operating temperatures, some variation does occur. One technique for eliminating variations in geometry due to temperature variations would be to maintain the temperature of the element absolutely constant. This is in most instances, however, either impossible or impractical. Accordingly, the present invention minimizes and in some instances eliminates geometrical changes in mirror 10 by controlling its temperature, at least during operation and preferably prior thereto, within a limited but practical, attainable carefully selected temperature range.

As the GGC element 12 comprises the significant structural element of mirror 10, the temperature control of the mirror is designed to minimize thermal geometical distortion of that GGC element. A better understanding of the invention will be derived from an analysis of the thermal expansion characteristics of various GGC materials as depicted in FIGS. 3-7. The thermal expansion characteristics of GGC materials are typically not a constant function of temperature, especially in the direction parallel to the axis of the graphite fibers. The graphs of FIGS. 3-7 depict the thermal strain or thermal expansion, i.e. $(\Delta L/L)(10^{-6})$, as a function of temperature for various types of GGC materials and in relation to certain orientations of graphite fibers in those materials. $\Delta L$, the increase in length of an article, is equal to $\alpha L_O \Delta t$, where $\alpha$ is a proportionality constant called the coefficient of linear expansion, $L_O$ is the length of the article at some reference temperature $t_O$ and $\Delta t$ represents the change in temperature from the $t_O$ reference. The coefficient of linear expansion for GGC materials, particularly axially of the graphite fibers, is not constant over an extended temperature range. The slopes of the plots in FIGS. 3-7 are representative of the coefficient of linear expansion and it will be noted in FIGS. 3, 5 6 and 7 that the slope varies in certain regions of thermal operation. More specifically, that slope may approach or attain zero, thereby indicating a minimum absolute value for the coefficient of linear expansion. As used herein, the term "minimum coefficient" is intended to mean an absolute value at or near zero and independent of sign. Referring to the equation for linear expansion set forth above, if the absolute value of the coefficient $\alpha$ is quite small, i.e. zero, over some $\Delta t$ operating range, the linear expansion $\Delta L$ will correspondingly be quite small, or zero.

In view of the foregoing, the mirror 10 is operated, at least during incidence of a laser beam therewith and preferably for some period immediately therebefore, within an attainable, practical temperature range which is selected to be at, or substantially at, the region of minimum or zero coefficient of axial thermal expansion for the particular GGC material.

The following table lists the temperature regions or ranges for which the coefficients of thermal expansion are substantially zero for GGC's of various composition and fiber orientation.

TABLE

| Matrix | Fiber | Orientation | Temperature Range for $\alpha \approx 0$ |
|---|---|---|---|
| 7740 | HMS | 0 | 175–275° C. |
| 7740 | HMS | 0/90 | 100–225° C. |
| 7740 | Th 300 + GY 70 | 0 | 125–215° C. |
| MAS | HMS | 0 | 120–230° C. |

Figure 3:
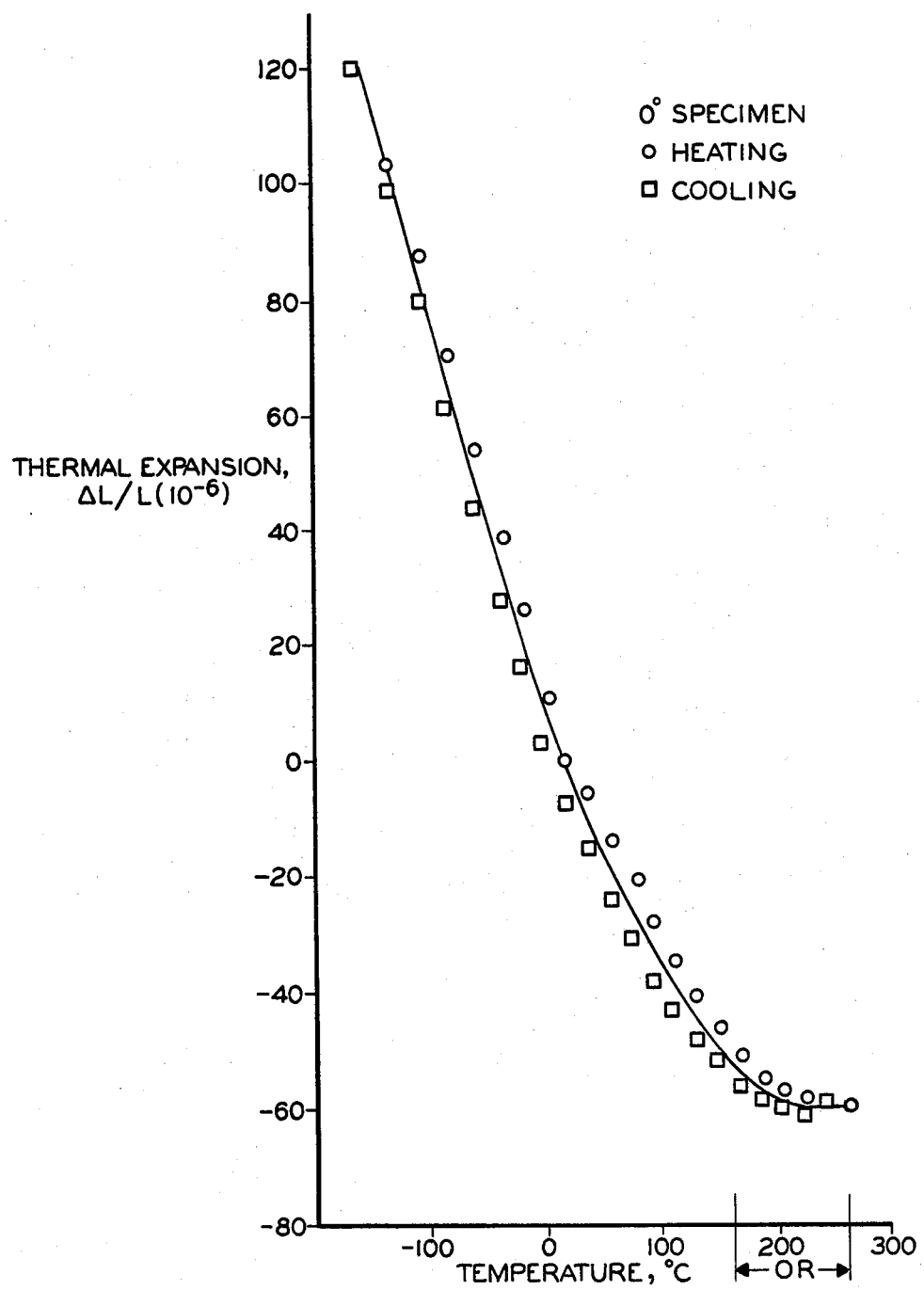
FIG. 3 graphically illustrates the axial thermal expansion characteristics of a unidirectionally reinforced graphite-glass composite material of HMS reinforced 7740.

Referring to FIG. 3, there is illustrated a graphical plot of the axial thermal expansion of a GGC comprising Corning 7740 glass unidirectionally reinforced with Hercules HMS graphite fiber. It will be noted that the slope of the plot of the thermal strain is a minimum and is effectively zero only in the temperature range of about 175°–275° C., that region being designated OR for "operating range" or "operating region". By confining operation to temperatures in the region OR, i.e. 175°–275° C., the GGC will exhibit substantially constant geometry axially of the graphite fiber pattern. The two symbols appearing in the graphical plot of FIG. 3 (and FIGS. 4-7) indicate a thermal cycling of the GGC, with the circles representing heating and squares representing cooling. The two curves do not precisely coincide, especially for the first several thermal cycles of the material, however, their regions of minimum or zero coefficient of thermal expansion do substantially coincide. Moreover, it may be desirable to thermally cycle the GGC material several times prior to its acutal use in an operating environment inasmuch as the graphical plots in both the heating and cooling directions substantially coincide after several such thermal cycles.

Figure 4:
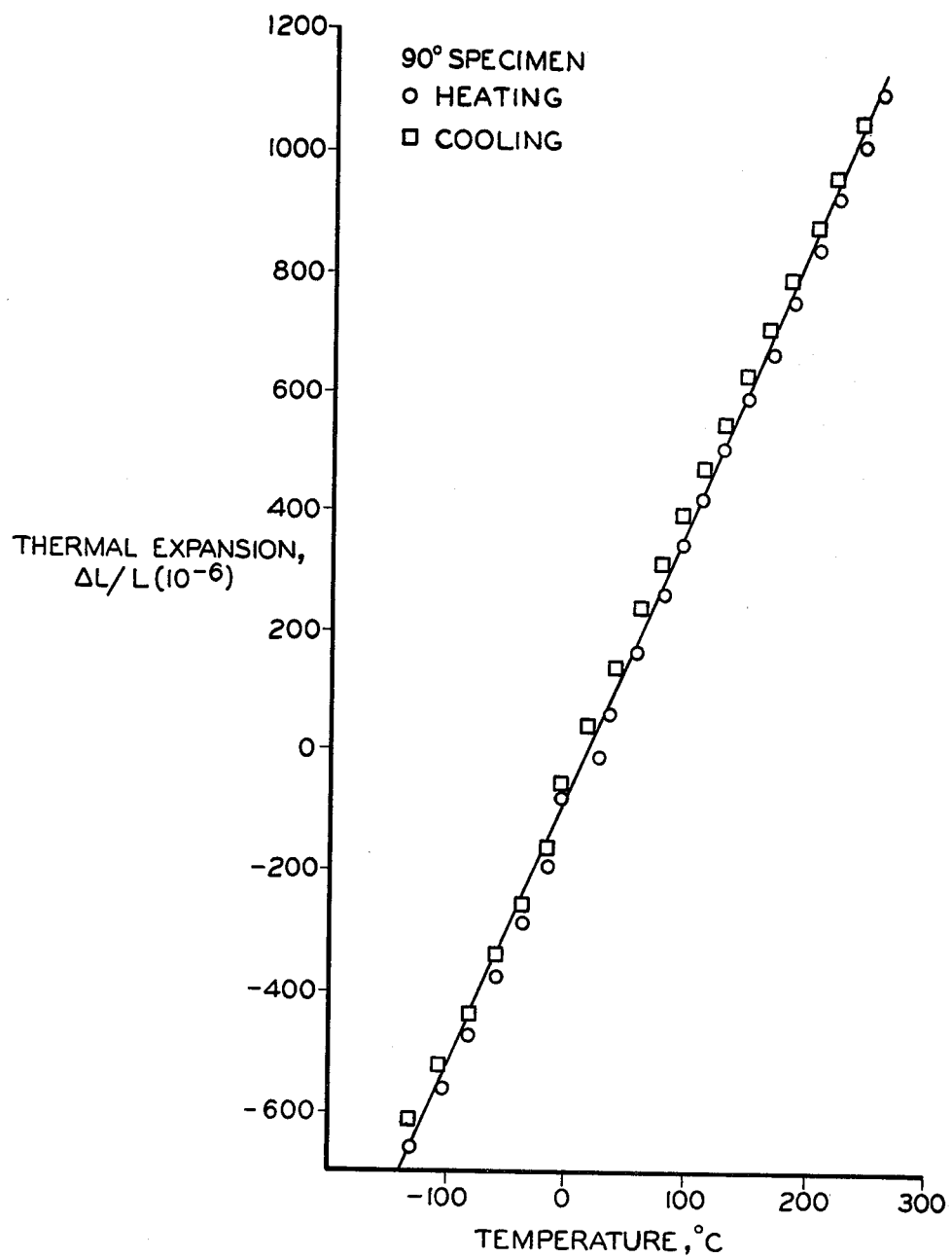
FIG. 4 graphically illustrates the transverse thermal expansion characteristics of a unidirectionally reinforced graphite-glass composite material of HMS reinforced 7740.

In FIG. 4, there is illustrated a graphical plot of the transverse thermal expansion of a GGC having the same composition as that of FIG. 3. It will be noted that in the direction transversely of the fiber orientation, the slope of the thermal strain is nonzero and is substantially constant such that the coefficient of thermal expansion, $\alpha$, is a constant non-zero value. Because the coefficient of transverse thermal expansion for that material is a constant, albeit non-zero, the region OR of minimum or zero coefficient of axial thermal expansion for that GGC material should be selected for operation to obtain maximum dimensional stability.

Figure 5:
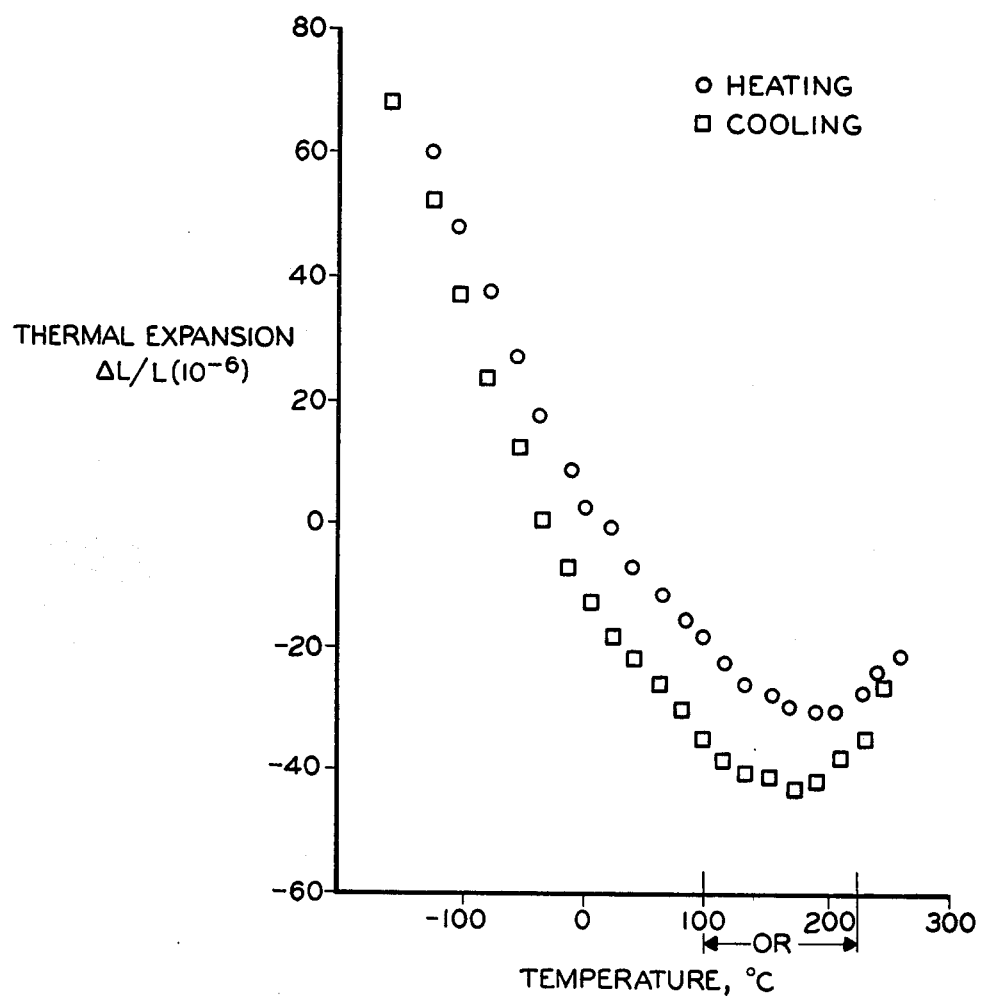
FIG. 5 graphically illustrates the axial thermal characteristics of a 0°/90° reinforced graphite-glass composite material of HMS reinforced 7740.

The graphical plot of FIG. 5 illustrates the axial thermal expansion characteristics of a GGC having 0°/90° HMS reinforced 7740. This GGC is the same as that used for the plots of FIGS. 3 and 4 except that the HMS graphite fibers are laid in a 0°/90° relationship or orientation to one another. This has the effect of applying the axial thermal stability of the region OR of FIG. 3 also in a transverse (now also axial) direction such that the entire composite generally reflects the characteristics exhibited in FIG. 5. It will be noted that the region OR of minimal or zero coefficient of axial thermal expansion now extends in all directions in the plane of the fibers and occurs in a temperature region of about 100°–225° C. This cross-layering of the graphite fibers thus is seen to further enhance the dimensional stability of the overall GGC article and may further have the effect of shifting (in this instance lowering) the region OR of zero coefficient of thermal expansion.

Figure 6:
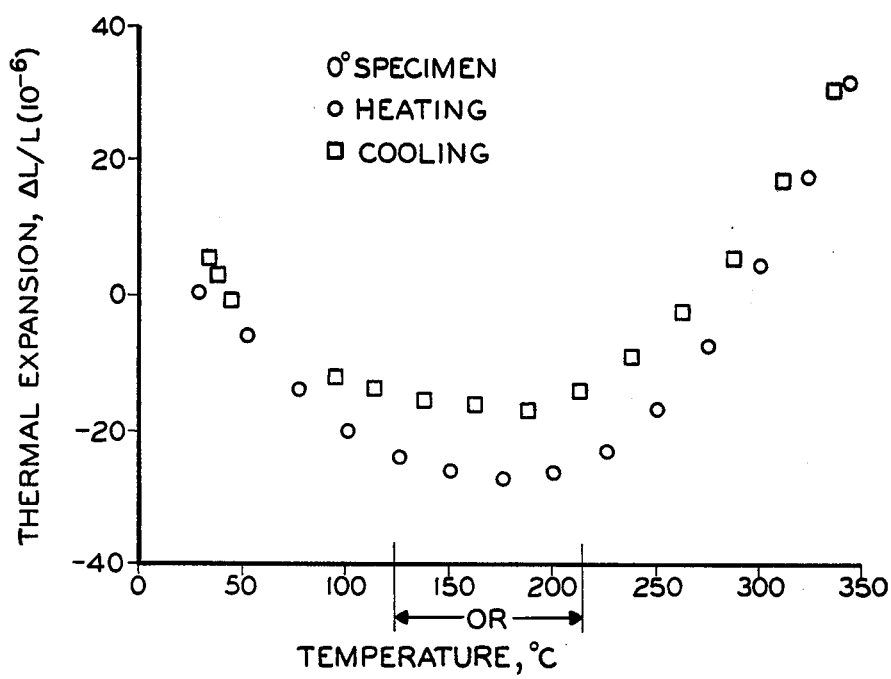
FIG. 6 graphically illustrates the axial thermal expansion characteristics of a unidirectionally reinforced graphite-glass composite material of Thornel 300 and GY 70 reinforced 7740.
Figure 7:
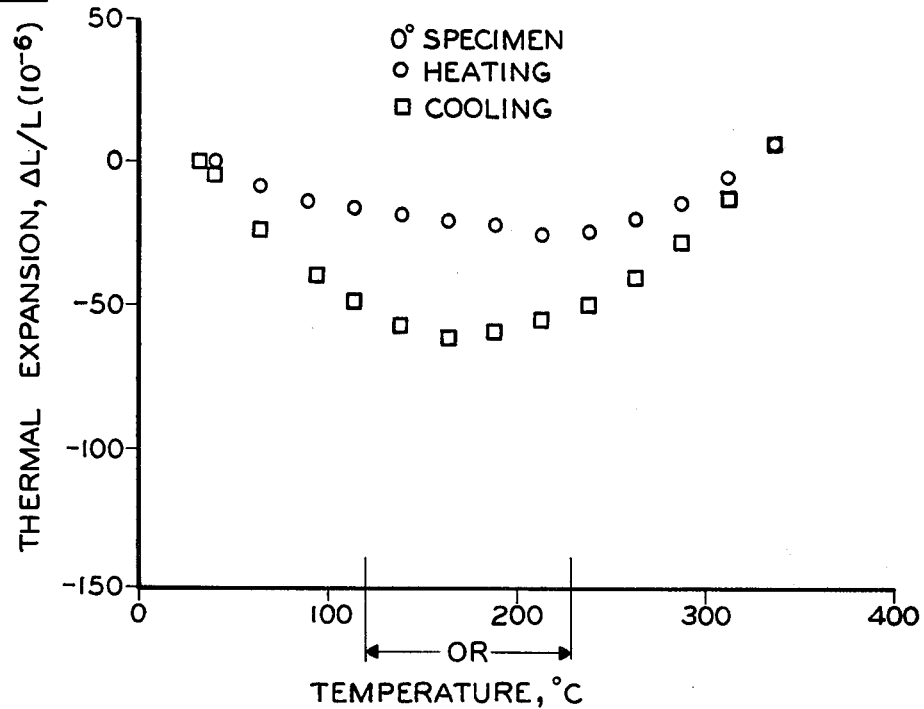
FIG. 7 graphically illustrates the axial thermal expansion characteristics of a unidirectionally reinforced graphite-glass composite material of HMS reinforced MAS glass.

FIG. 6 graphically depicts a plot of the axial thermal expansion of yet another GGC, this comprising a unidirectionally reinforced blend of 50% Thornel 300 and 50% GY 70 graphite fibers in 7740 glass. It will be observed that the region OR of zero coefficient of axial thermal expansion for this material is in the range of 125°–215° C. Another example is provided in FIG. 7 where the thermal expansion behavior of a unidirectionally reinforced HMS fiber in magnesia alumino silicate (MAS) glass in shown. In this case the region OR is between 120°–230° C. In both FIGS. 6 and 7, although there is a difference in thermal strain on heating and cooling, it is important to note that the final specimen dimensions at the completion of the thermal cycle are equivalent to the dimensions at the initiation of the cycle. Moreover, cycling within the region OR greatly minimizes any difference in the thermal strain in that range.

Returning to FIG. 1, there is illustrated one arrangement by which the temperature of the laser mirror 10 is maintained within the range at which the coefficient of axial thermal expansion of the mirror and specifically the GGC element 12 is maintained at a minimum, generally zero. A suitable temperature sensor 30 is positioned in operative association with the mirror 10, and specifically element 12, for sensing its temperature and providing an electrical signal representative thereof to a temperature controller, generally represented by the box 32. Controller 32 is capable of responding to the temperature signal provided by sensor 30 to increase or decrease the temperature of the mirror 10. This mode of control occurs during operation of the mirror with the laser beam incident thereon and preferably is begun prior to that operation in order to remain dimensionally stable when operation with the laser beam is begun.

Temperature controller or conditioner 32 may regulate the temperature of mirror 10 by controlling the temperature of a gas or liquid immediately surrounding the mirror. However, in a preferred arrangement the temperature control is effected in a more direct manner, as by electrically heating the mirror directly and/or passing a fluid coolant through a portion of the mirror.

A pair of electrical contacts 34 and 36 are placed in contact with the GGC material along opposite portions of the periphery of the mirror and an electrical potential may be applied therebetween, via conductors 34' and 36' which may derive directly or indirectly from the HEAT output of the temperature controller 32. The GGC material is electrically conductive and the electrical current passed between contacts 34 and 36 through the graphite fibers of the composite causes self-heating of the composite to achieve the desired temperature of operation. The number, shape and positioning of the electrical contacts on the mirror periphery may be varied somewhat to obtain various heating responses. Tests have demonstrated the ability of such an arrangement to attain and/or maintain GGC temperatures in excess of 100° C. The thermal stability of the glass allows this heating to continue into the operating region OR of the composite without degrading the properties of the composite.

Alternatively, if it is necessary to cool mirror 10 to maintain its temperature within a preset operating range, the COOL output of controller 32 may respond by controlling the temperature and/or flow of a fluid coolant through the passages 26 in the mirror to attain and maintain that preset temperature range.

Although this invention has been shown and described with respect to detailed embodiments thereof, it will be understood by those skilled in the art that various changes in form and detail thereof may be made without departing from the spirit and scope of the claimed invention.

I claim:

1. For a laser mirror comprising principally a graphite fiber reinforced-glass matrix composite, the thermal strain for said composite over a wide temperature range being a non-linear function of temperature, said function exhibiting a region of minimum absolute slope, the method of minimizing changes in the size of said mirror comprising the step of:
   maintaining the temperature of said mirror within a limited range in said wide temperature range, said limited range being substantially at said region of minimum slope of said thermal strain function for said composite.

2. The method of claim 1 wherein said limited operating temperature range is substantially coextensive with said region of minimum slope of said thermal strain function.

3. The method of claim 2 wherein said minimum slope is substantially zero.

4. For a laser mirror comprised principally of a graphite fiber reinforced-glass matrix composite, the coefficient of linear thermal expansion for said composite being substantially zero over a particular limited temperature range, the method of minimizing changes in the size of said mirror comprising the steps of:
   maintaining said composite within a second limited temperature range, said second limited temperature range being coincident with at least a portion of said particular limited temperature range.

5. For use with a laser mirror comprising, in significant part, a graphite fiber reinforced-glass matrix composite, the method of minimizing thermal geometrical distortion of the mirror comprising the step of:
   maintaining the temperature of said composite, at least during a particular time interval, within a temperature range at which the absolute value of the coefficient of axial thermal expansion of the composite is substantially a minimum.

6. The method of claim 5 wherein said absolute value of the coefficient of axial thermal expansion within said temperature range is substantially zero.

7. The method of claim 5 wherein said temperature maintaining step comprises disposing variably controllable temperature conditioning means in operative association with said mirror, sensing the temperature of said mirror, and controlling said temperature conditioning means to maintain the sensed temperature within said range which minimizes the coefficient of thermal expansion of said composite.

8. The method of claim 5 wherein the maintenance of said composite temperature within a range at which the coefficient of thermal expansion thereof is a minimum requires the addition of heat thereto and said temperature maintaining step comprises heating said composite by passing an electrical current therethrough.

9. The method of claim 7 wherein the maintenance of said composite temperature within a range at which the coefficient of thermal expansion thereof is a minimum requires the addition of heat thereto and said temperature maintaining step comprises heating said composite by passing an electrical current therethrough.

10. The method of claim 5 wherein said mirror is for use with a laser beam incident thereon and said particular interval during which said composite is maintained within said temperature range is at least during operation with said laser beam incident on said mirror.

11. The method of claim 5 wherein said temperature range is at least about 25° C. in extent.

12. The method of claim 10 wherein said particular interval during which said composite is maintained within said temperature range begins prior to said operation with a laser beam.

13. In a laser mirror comprised in significant part of a graphite fiber reinforced-glass matrix composite, means for heating said mirror comprising at least two electrical contacts positioned in electrical connection with said composite at respectively spaced positions thereon; and means for applying a source of electrical potential between said contacts to cause a current to flow therebetween, said current being sufficient to resistively heat said composite.

* * * * *